US008172236B2

(12) United States Patent
Shibata

(10) Patent No.: US 8,172,236 B2

(45) Date of Patent: May 8, 2012

(54) BIT MOUNTING DEVICES

(75) Inventor: Yoshinori Shibata, Anjo (JP)

(73) Assignee: Makita Corporation, Anjo-shi (JP)

( * ) Notice: Subject to any disclaimer, the term of this patent is extended or adjusted under 35 U.S.C. 154(b) by 1105 days.

(21) Appl. No.: 12/071,872

(22) Filed: Feb. 27, 2008

(65) Prior Publication Data

US 2008/0217870 A1 Sep. 11, 2008

(30) Foreign Application Priority Data

Mar. 7, 2007 (JP) ................................ 2007-056748

(51) Int. Cl.
*B23B 31/06* (2006.01)
*B23B 31/28* (2006.01)
*B23B 31/107* (2006.01)

(52) U.S. Cl. .......... 279/143; 279/76; 279/128; 279/137; 279/155; 81/177.85; 81/438

(58) Field of Classification Search .................... 279/76, 279/82, 102, 143, 144, 155, 137; 81/124.1, 81/177.85, 438; *B23B 31/06, 31/28, 31/107*
See application file for complete search history.

(56) References Cited

U.S. PATENT DOCUMENTS 2,285,956 A * 6/1942 Weber .......................... 279/102
2,369,321 A * 2/1945 Stalker .......................... 279/102
2,833,548 A * 5/1958 Clark ............................ 279/102
5,012,708 A * 5/1991 Martindell ...................... 81/429
5,062,749 A * 11/1991 Sheets ............................ 279/75
5,213,347 A * 5/1993 Rulon et al. .................. 279/102
5,934,384 A * 8/1999 Wang ............................ 173/132
6,199,872 B1 * 3/2001 Hasan ............................ 279/30
6,270,085 B1 * 8/2001 Chen et al. ...................... 279/22
6,311,989 B1 * 11/2001 Rosanwo ........................ 279/75
6,325,393 B1 * 12/2001 Chen et al. ...................... 279/22
6,345,560 B1 * 2/2002 Strauch et al. .................. 81/477
6,457,916 B2 * 10/2002 Wienhold ...................... 408/240
6,637,755 B2 * 10/2003 Chen et al. ...................... 279/22
6,644,150 B2 * 11/2003 Chen ............................... 81/438
6,722,667 B2 * 4/2004 Cantlon .......................... 279/22
6,860,489 B2 * 3/2005 Chen ............................... 279/82
6,874,791 B2 * 4/2005 Chen et al. ...................... 279/75
6,935,637 B2 * 8/2005 Cantlon .......................... 279/75
6,953,196 B1 * 10/2005 Huang ............................ 279/75
6,966,562 B1 * 11/2005 Wienhold ........................ 279/75
6,973,858 B2 * 12/2005 Huang ....................... 81/177.85
7,114,728 B2 * 10/2006 Chen ............................... 279/24
7,131,358 B2 * 11/2006 Hsien .............................. 81/438
7,159,493 B1 * 1/2007 Huang ............................ 81/438
7,424,841 B2 * 9/2008 Liu ................................. 81/438
(Continued)

FOREIGN PATENT DOCUMENTS

DE 3241825 A1 * 5/1984
(Continued)

*Primary Examiner* — Eric A Gates
(74) *Attorney, Agent, or Firm* — Oliff & Berridge, PLC

(57) ABSTRACT

A bit mounting device includes a holder that may be mounted to a spindle of the power tool or may be a part of the spindle. A bit push member is disposed within a bit receiving hole that is formed in the holder for receiving a tool bit. The movement of the operation member is transmitted to the bit push member via a transmission mechanism, so that the tool bit is pushed in a removing direction from the bit receiving hole by the bit push member.

17 Claims, 9 Drawing Sheets

U.S. PATENT DOCUMENTS

| | | | | |
|---|---|---|---|---|
| 7,448,302 | B2 * | 11/2008 | Huang | 81/438 |
| 7,469,909 | B2 * | 12/2008 | Strauch et al. | 279/75 |
| 7,581,470 | B1 * | 9/2009 | Huang | 81/438 |
| 7,726,664 | B2 * | 6/2010 | Peters | 279/143 |
| 7,823,890 | B2 * | 11/2010 | Chen | 279/143 |
| 7,891,275 | B2 * | 2/2011 | Huang | 81/438 |
| 7,913,592 | B2 * | 3/2011 | Hu | 81/438 |
| 7,922,180 | B2 * | 4/2011 | Meng | 279/143 |
| 2001/0043841 | A1 | 11/2001 | Wienhold | |
| 2003/0230862 | A1 * | 12/2003 | Peters et al. | 279/82 |
| 2004/0262856 | A1 * | 12/2004 | Cantlon | 279/22 |
| 2006/0097464 | A1 * | 5/2006 | Strauch et al. | 279/75 |
| 2006/0123957 | A1 * | 6/2006 | Hsien | 81/438 |
| 2007/0108706 | A1 * | 5/2007 | Cornwell et al. | 279/143 |
| 2007/0234856 | A1 * | 10/2007 | Liu | 81/438 |
| 2009/0064827 | A1 * | 3/2009 | Chen | 81/438 |
| 2009/0139379 | A1 * | 6/2009 | Chiang et al. | 81/438 |
| 2011/0006489 | A1 * | 1/2011 | Lai | 279/82 |
| 2011/0215538 | A1 * | 9/2011 | Cornwell et al. | 279/82 |

FOREIGN PATENT DOCUMENTS

| | | | |
|---|---|---|---|
| DE | 103 48 057 | B3 | 12/2004 |
| DE | 20 2006 005 215 | U1 | 7/2006 |
| DE | 20 2006 018 218 | U1 | 3/2007 |
| JP | U-03-059163 | | 6/1991 |
| JP | B2-3479936 | | 10/2003 |
| JP | A-2005-528991 | | 9/2005 |
| WO | WO 00/37220 | A1 | 6/2000 |
| WO | WO 03/103901 | A2 | 12/2003 |

* cited by examiner

BIT MOUNTING DEVICES

This application claims priority to Japanese patent application serial number 2007-056748, the contents of which are incorporated herein by reference.

BACKGROUND OF THE INVENTION

1. Field of the Invention

The present invention relates to bit mounting devices for mounting tool bits, such as driver bits and socket bits, to spindles of rotary tools, such as power screwdrivers.

2. Description of the Related Art

Japanese Laid-Open Utility Model Publication No. 3-59163, Japanese Laid-Open Patent Publication No. 2005-528991 (corresponding to WO03/103901), and Japanese Patent No. 3479936 teach techniques relating to bit mounting devices for mounting tool bits to spindles of tool bodies. The tool bits used in these techniques are attached to the spindles by magnetic forces and are called "magnetic connecting bits."

According to the technique disclosed in Japanese Utility Model Publication No. 3-59163, a magnet is disposed at the bottom of a bit receiving hole and is biased in a bit removing direction by a spring. A stop ring is attached to the inner circumferential surface of the inlet portion of the bit receiving hole. The tool bit is prevented from being removed from the bit mounting hold due to direct engagement of the tool bit with the stop ring (called "stop ring engaging system"). With this arrangement, it is possible to prevent the magnet from being accidentally damaged.

According to the technique disclosed in Japanese Laid-Open Patent Publication No. 2005-528991, a bit mounting device has a magnet disposed at the bottom of a bit receiving hole for attracting and holding the bit. A steel ball(s) directly engages the outer circumferential surface of the tool bit in order to prevent the bit from being removed (called "steel ball engaging system").

According to the technique of Japanese Patent No. 479936, a magnet is positioned within a hexagonal hole formed in a socket bit, so that a head of a hexagonal bolt can be attracted and can be held in position. However, this technique does not have direct relation with the construction for mounting the tool bit itself.

According to the stop ring engaging system of Japanese Utility Model Publication No. 3-59163, the tool bit is prevented from being removed by the engagement by the stop ring in addition to the attraction by the magnet. Therefore, in particular when the bit is removed, it is necessary for a user to pinch the bit with his or her fingers and to withdraw the bit by a large force for enlargement of the stop ring against the resilient force. Therefore, there has been a need for improvement in the operability for the bit removing operation.

Japanese Laid-Open Patent Publication No. 2005-528991 (corresponding to WO03/103901) is improved in the operability for the bit removing and mounting operations, because axially moving an operation sleeve can release the engagement by the steel ball(s) to enable removal of the tool bit against only the attracting force of the magnet. However, in the case of the steel ball engaging system, the mounting device must have a large diameter, because it is necessary to position the steel ball(s) around the tool bit. If the diameter of the mounting device is too large, magnetic connecting bits of the stopper ring engaging system that is most popularly incorporated cannot be used.

Therefore, there has been a need for bit mounting devices that enables tool bits to be easily removed without incorporating the steel ball engaging system.

SUMMARY OF THE INVENTION

One aspect according to the present invention includes a bit mounting device for a power tool. The bit mounting device includes a holder that may be mounted to a spindle of the power tool or may be a part of the spindle. A bit push member is disposed within a bit receiving hole that is formed in the holder for receiving a tool bit. An operation member is movably attached to the holder. The movement of the operation member is transmitted to the bit push member via a transmission mechanism, so that the tool bit is pushed in a removing direction from the bit receiving hole by the bit push member. The transmission mechanism may be a cam mechanism, a gear mechanism, or any other suitable mechanism.

DETAILED DESCRIPTION OF THE INVENTION

Figure 1:
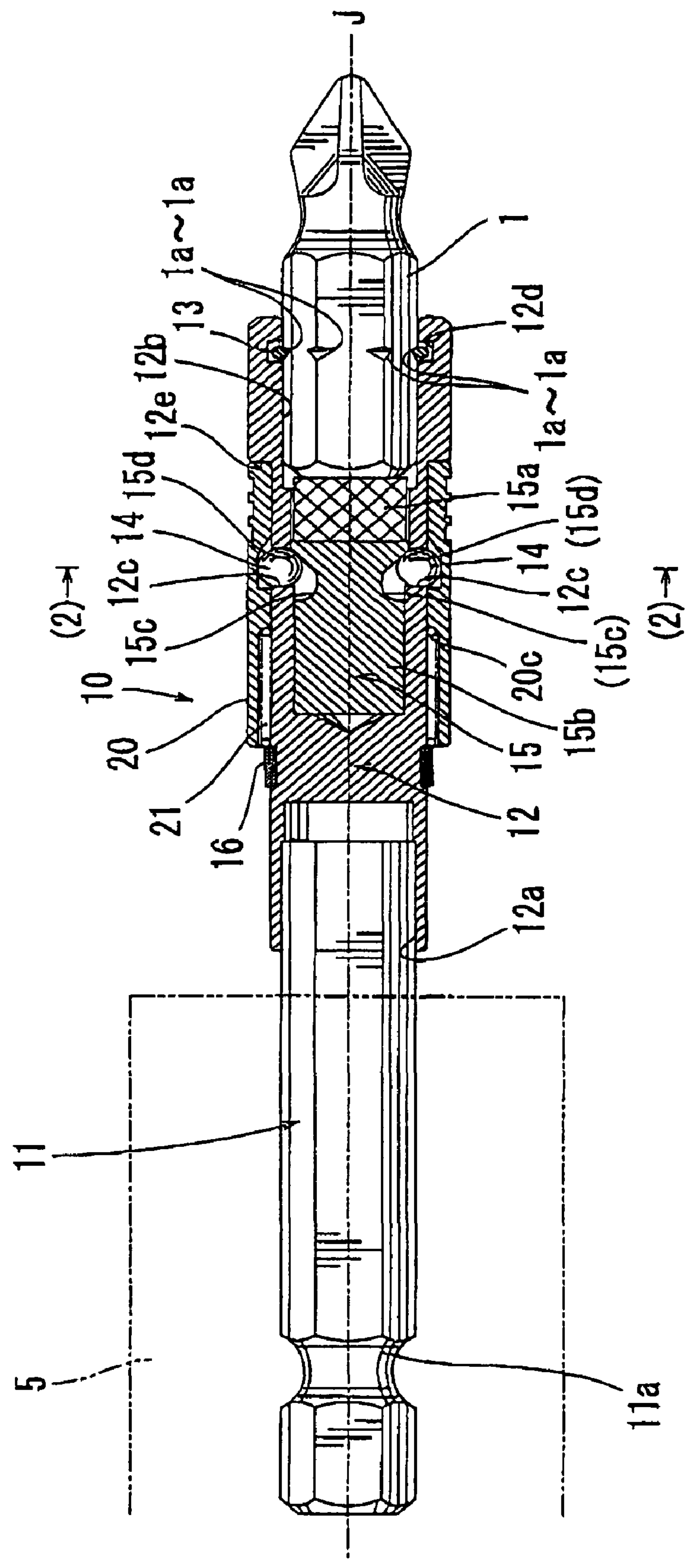
FIG. 1 is a vertical sectional view of a bit mounting device according to a first embodiment of the present invention and showing the state where a tool bit has been mounted.

Each of the additional features and teachings disclosed above and below may be utilized separately or in conjunction with other features and teachings to provide improved bit mounting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a bit mounting device for mounting a tool bit on a spindle of a rotary tool includes a mount shaft and a holder. The mount shaft is adapted to be mounted to the spindle. The holder defines a bit receiving hole that has the same axis as the mount shaft. A stop ring is attached to an inner circumference of an inlet portion of the bit receiving hole and is directly engageable with the tool bit for preventing the tool bit from being removed from the bit receiving hole. A bit push member is positioned within the bit receiving hole on the side of a bottom of the bit receiving hole and is movable in a bit mounting direction and a bit removing direction opposite to the bit mounting direction. An operation sleeve is attached to the holder and is movable in opposite directions parallel to the axis of the mount shaft. The movement of the operation sleeve in one of the opposite directions causes the bit push member to move in the bit removing direction, so that the tool bit is disengaged from the stop ring.

With this arrangement, the stop ring that directly engages the tool bit can restrict the movement of the tool bit in the bit removing direction. Therefore, it is possible to use popularly used magnetic connecting bits as a tool bit, so that the compatibility of the bit mounting device can be ensured.

As the operation sleeve moves in one direction along the axial direction, the tool bit can be pushed in the removing direction from the bit receiving hole by the bit push member. Therefore, removing the tool bit requires a smaller force in comparison with the case where the operator directly pinches the tool bit with his or her fingers and withdraws the tool bit.

Further, because no steel ball directly engages the tool bit for preventing removal of the tool bit, it is possible to design that the diameter of the bit mounting device does not exceed a diameter of a known bit mounting device in which a stop ring prevents a magnetic connecting bit from being removed.

For this reason, the bit mounting device may have advantages of both of the stop ring engaging system and the steel ball engaging system.

Although the tool bit is removed by the movement of the operation sleeve in the axial direction, the operator can remove the tool bit by directly withdrawing the tool bit against the engagement by the stop ring in the case that the operation sleeve cannot be moved due to clogging by dust or due to engagement by foreign particles.

The bit mounting device may include a steel ball(s) retained by the holder in a position around the bit receiving hole. The steel ball(s) can move relative to the holder in a substantially radial direction with respect to the axis of the mount shaft. A guide slant surface may be formed on the bit push member and may be inclined relative to the direction of movement of the steel ball(s). As the operation sleeve moves in one of the opposite directions, the steel ball(s) slides along the guide slant surface, so that the movement of the steel ball(s) may be converted into the movement of the bit push member in the bit removing direction. The tool bit can be removed by the movement of the bit push member in the bit removing direction.

The bit push member may be or may include a magnet that can attract and hold the tool bit. Therefore, the tool bit can be prevented from being removed by the magnet in addition to the stop ring that directly engages the tool bit. As a result, it is possible to reliably hold the tool bit at a predetermined position.

In another embodiment, a bit mounting device includes a holder defining a bit receiving hole extending along an axial direction, a bit push member disposed within the bit receiving hole and movable relative to the holder along the axial direction, an operation member movably attached to the holder, and a transmission mechanism interleaved between the operation member and the bit push member, so that the movement of the operation member can be transmitted to the bit push member.

The operation member can move in a direction parallel to the axis of the bit receiving hole, and the transmission mechanism may include a cam mechanism. The cam mechanism includes a cam member that can move in a direction transverse to the axis of the bit receiving hole as the operation member is moved. The cam mechanism further includes a first cam surface formed on the operation member and a second cam surface formed on the bit push member. The cam member is interleaved between the first cam surface and the second cam surface.

The cam member may be a ball member(s), such as a steel ball(s). The first cam surface may be inclined in a first direction relative to a plane perpendicular to the axial direction of the bit receiving hole. The second cam surface may be inclined in a second direction opposite to the first direction with respect to the plane. As the operation member moves in the direction parallel to the axis of the bit receiving hole, the ball member(s) slides along the first cam surface and is pressed against the second cam surface, so that the bit push member moves in the axial direction. Each of the first and second cam surfaces may be a conical surface.

A first embodiment of the present invention will now be described with reference to FIGS. 1 to 7. A bit mounting device 10 shown in FIG. 1 is designed for mounting a tool bit (magnetic connecting bit) 1 to a spindle of a rotary tool, such as a power screwdriver (not shown). Referring to FIG. 1, the bit mounting device 10 has a mount shaft 11 and is mounted to the front portion of the spindle of the rotary tool via a chuck device 5. The chuck device 5 is prevented from being removed from the mount shaft 11 through engagement of a steel ball (not shown) with an engaging groove 11*a* formed in the mount shaft 11.

The bit mounting device 10 includes the mount shaft 11 and a holder 12. The mount shaft 11 has a hexagonal column-like configuration and has a rear end portion (left end portion as viewed in FIG. 1) that has the engaging groove 11*a*. The engaging groove 11*a* is formed in the outer circumferential surface of the rear end portion of the mount shaft 11 along its entire circumference. A joint hole 12*a* having a hexagonal cross-sectional configuration is formed in the rear end of the holder 12. The front side part of the mount shaft 11 is press-fitted into the joint hole 12*a*, so that the mount shaft 11 is joined to the holder 12 coaxially therewith. In this specification, the side of the tool bit 1 (right side as viewed in FIG. 1) is called "front side", and the side of the rotary tool is called "rear side." A reference axis J is the rotational axis of the tool bit 1.

A bit receiving hole 12*b* is formed in the front end of the holder 12. A stop ring 13 is attached to the inner circumferential surface of the inlet portion of the bit receiving hole 12*b*. More specifically, a retaining groove 12*d* is formed in the inner circumferential surface of the inlet portion along its entire circumference, and the stop ring 13 is held within the retaining groove 12*d*. Within the retaining groove 12*d*, the stop ring 13 can resiliently deform in a radial direction. In the fitted state, the stop ring 13 is resiliently deformed to reduce its diameter and can be forcibly enlarged as the tool bit 1 is inserted into the stop ring 13. When the tool bit 1 is in a predetermined position for mounting within the holder 12, the stop ring 13 resiliently engages engaging recesses 1*a* formed in the outer circumferential surface of the tool bit 1, so that the tool bit 1 can be prevented from being removed from the holder 12. The tool bit 1 that can be mounted by using the bit mounting device 10 of this embodiment has a hexagonal column-like configuration and has six engaging recesses 1*a* respectively formed at six corners of the outer circumferential surface of the tool bit 1.

Figure 2:
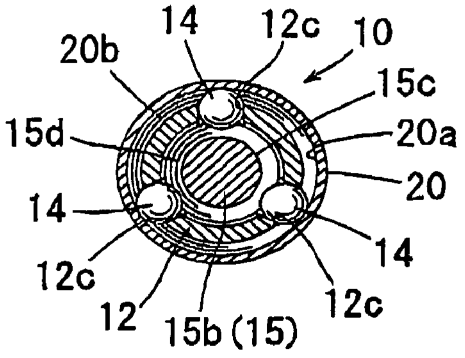
FIG. 2 is a cross sectional view taken along line (2)-(2) in FIG. 1.
Figure 3:
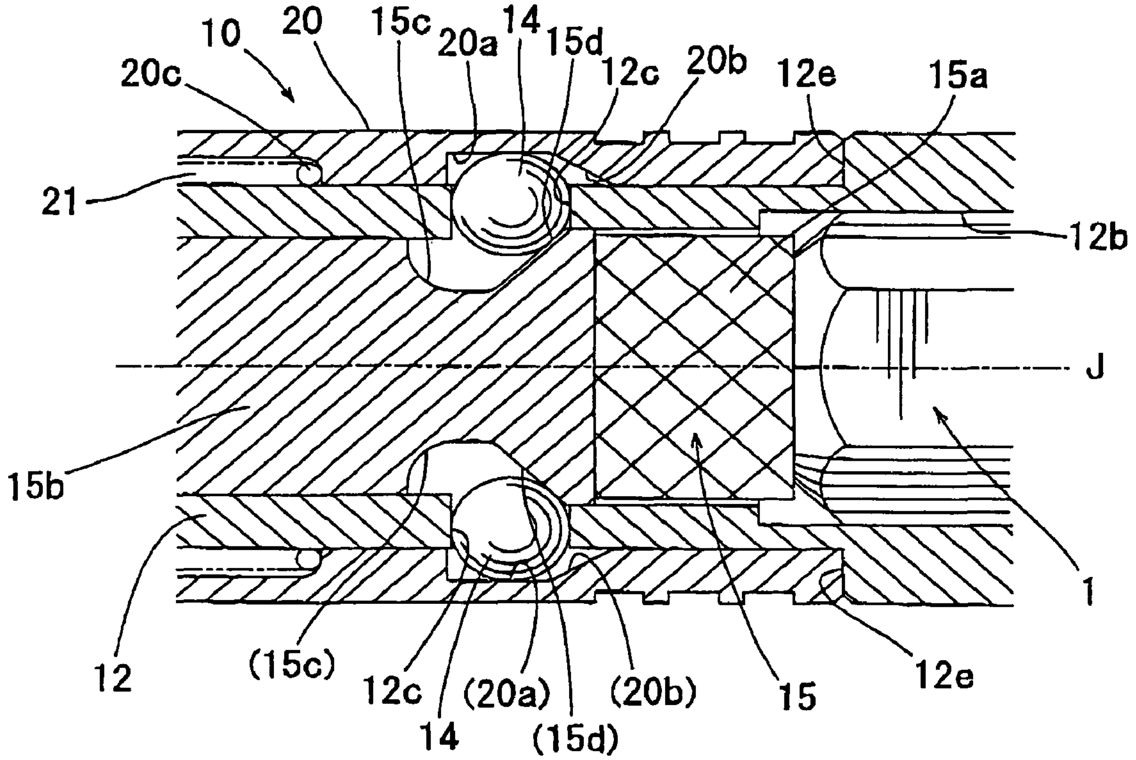
FIG. 3 is an enlarged view of a part about a magnet of the bit mounting device shown in FIG. 1.

A bit push member 15 is disposed within the bottom of the bit receiving hole 12*b*. The bit push member 15 includes a cylindrical column-like magnet 15*a* and a magnet support 15*b*. The magnet 15*a* is fixedly attached to the front end of the magnet support 15*b*. The magnet support 15*b* is received within the bit receiving hole 12*b* and is movable relative to the bit receiving hole 12*b* in a direction along the axis J of the holder portion 12 (right and left directions as viewed in FIG. 2), while no substantial clearance is provided in a radial direction between the inner circumferential wall of the bit receiving hole 12*b* and the magnet support 15*b*. The details of the bit push member 15 and the bit push member 15 are shown in FIGS. 2 and 3.

An engaging groove 15*c* is formed in the outer circumferential surface of the magnet support 1*b* along its entire circumference. The front wall portion of the engaging groove 15*c* is configured as a guide slant surface 15*d*. The guide slant surface 15*d* has a conical configuration that has a diameter increasing toward the front side along the axis 3. Three retaining holes 12*c* are formed in the holder 12 in positions opposing to the engaging groove 15*c* and are spaced equally from each other in the circumferential direction. A steel ball 14 is held within each retaining hole 12*c* and protrudes both radially inside and radially outside from the holder 12. A radially inner part of the steel ball 14 protruding radially inside from the holder 12 is in engagement with the engaging groove 15*c* of the magnet support 15*b* and slidably contacts the guide slant surface 15*d*. A radially outer part of the steel ball 14 protruding radially outside from the holder 12 is in engagement with an engaging groove 20*a* formed in an operation sleeve 20. The operation sleeve 20 is attached to the holder 12 and is slidably movable relative to the outer circumferential surface of the holder 12. The engaging groove 20*a* is formed in the inner circumferential surface of the operation sleeve 20 along its entire circumference. The front wall of the engaging groove 20*a* is configured as a guide slant surface 20*b*. The guide slant surface 20*b* has a conical configuration that has a diameter increasing in the rearward direction along the axis J. The direction of inclination of the guide slant surface 20*b* is opposite to the direction of inclination of the guide slant surface 15*d* of the magnet support 15*b*. In this way, each steel ball 14 is held between the guide slant surface 15*d* of the magnet support 15*b* and the bottom wall (radially outer wall) of the engaging groove 20*a* of the operation sleeve 20.

Figure 4:
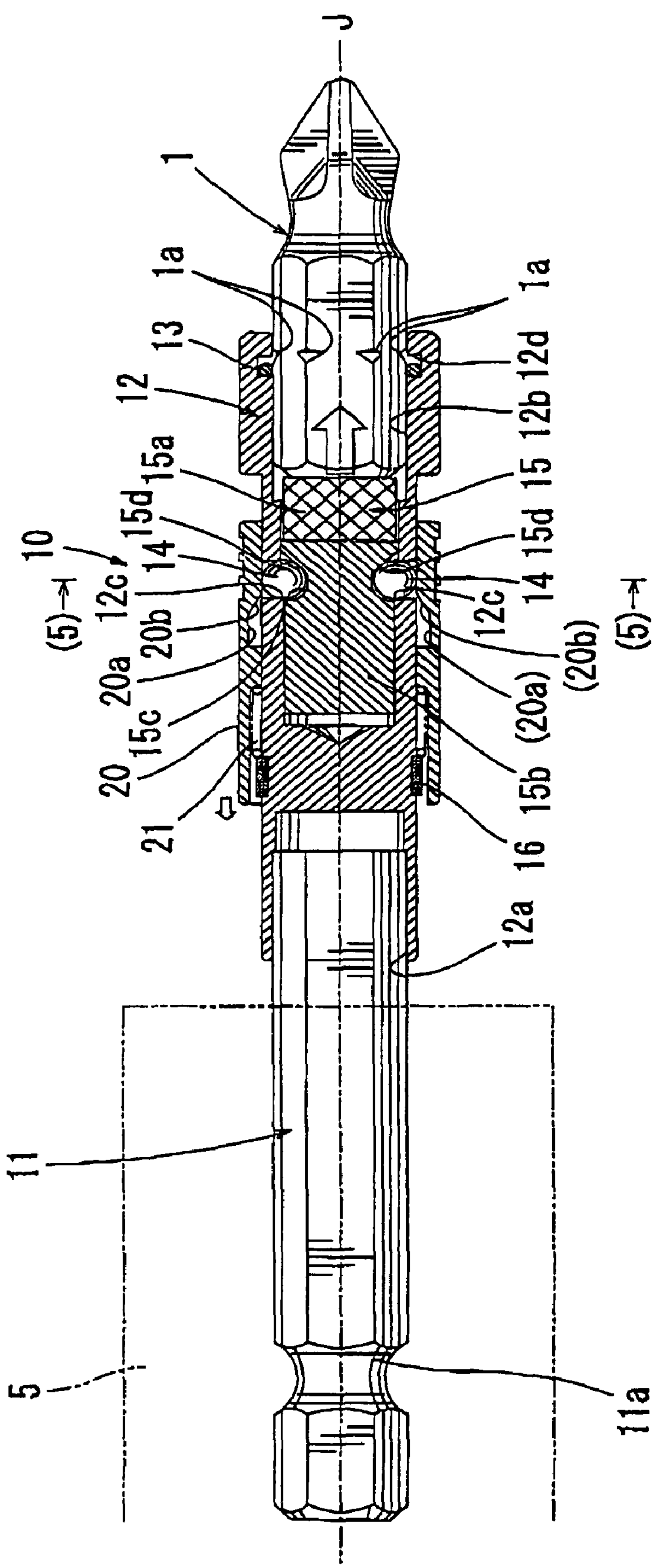
FIG. 4 is a view similar to FIG. 1, but showing the state where an operation member has slid to a bit removing position.
Figure 5:
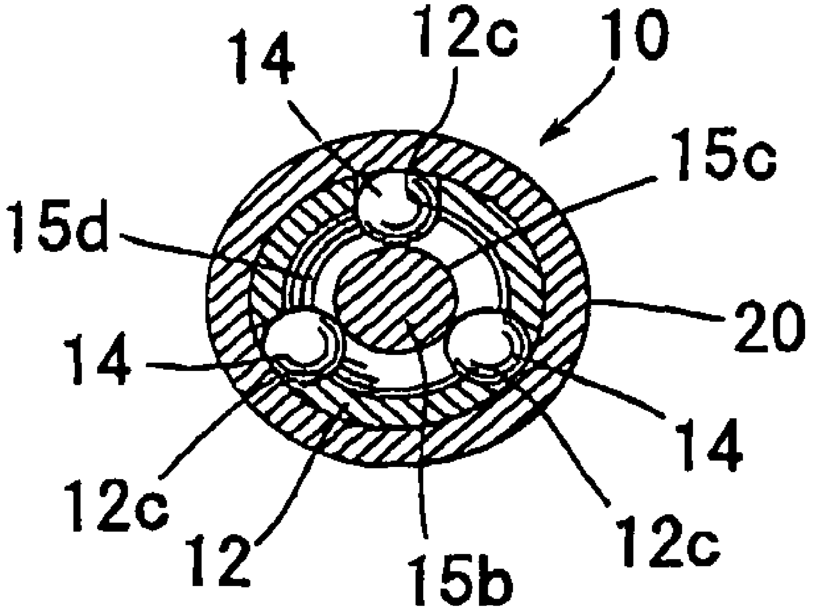
FIG. 5 is a cross sectional view taken along line (5)-(5) in FIG. 4.

The operation sleeve 20 is supported on the outer circumference of the holder 12, such that the operation sleeve 20 can move in the direction parallel to the axis J. A compression spring 21 biases the operation sleeve 20 toward the front side. The compression spring 21 is interleaved between a stationary ring 16 attached the outer circumferential surface of the rear part of the holder 12 and a stepped portion 20*c* formed on the inner circumferential surface of the rear part of the operation sleeve 20. As shown in FIG. 4, as the operation sleeve 20 is moved reawardly to a bit removing position, the stationary ring 16 enters the inside of the operation sleeve 20, so that the stationary ring 16 does not interfere with the movement of the operation sleeve 20.

The forwardly stroke end (a bit mounting position) of the operation sleeve 20 is restricted by a stepped portion 12*e* that is formed on the outer circumferential surface of the holder 12 along its entire circumference.

When the operation sleeve 20 is in the bit mounting position shown in FIG. 1, each steel ball 14 is held between the guide slant surface 15*d* of the magnet support 15*b* and the bottom wall of the engaging groove 20*a* of the operation sleeve 20.

As the operation sleeve 20 moves leftwardly toward the bit removing position against the biasing force of the compression spring 21 as shown in FIG. 4, each steel ball 14 moves radially inward of the bit receiving hole 12*b* due to the inclination of the guide slant surface 20*b* of the operation sleeve 20. The radially inward movement of each steel ball 14 results that each steel ball 14 is pressed against the guide slant surface 15*d*. Due to the inclination of the guide slant surface 15*d*, a force is produced to move the magnet support 15*b* toward the bit removing direction (right direction as viewed in FIG. 4). Therefore, the magnet support 15*b* and the magnet 15*a* are forced to move in the bit removing direction against the resilient engaging force applied by the stop ring 13, so that the engagement by the stop ring 13 is released. FIG. 4 shows the state where the operation sleeve 20 has been moved leftward as viewed in FIG. 4 to the bit removing position, where the tool bit 1 is free from engagement by the stop ring 13.

In the position shown in FIG. 4, the stop ring 13 is disengaged from the engaging recesses 1*a* of the tool bit 1, and therefore, the tool bit 1 is held within the bit receiving hole 12*b* only by the attraction force of the magnet 15*b* of the bit push member 15. Therefore, the operator can easily remove the tool bit 1 from the bit receiving hole 12*b*, for example, by pinching the tool bit 1 with his or her fingers.

Figure 6:
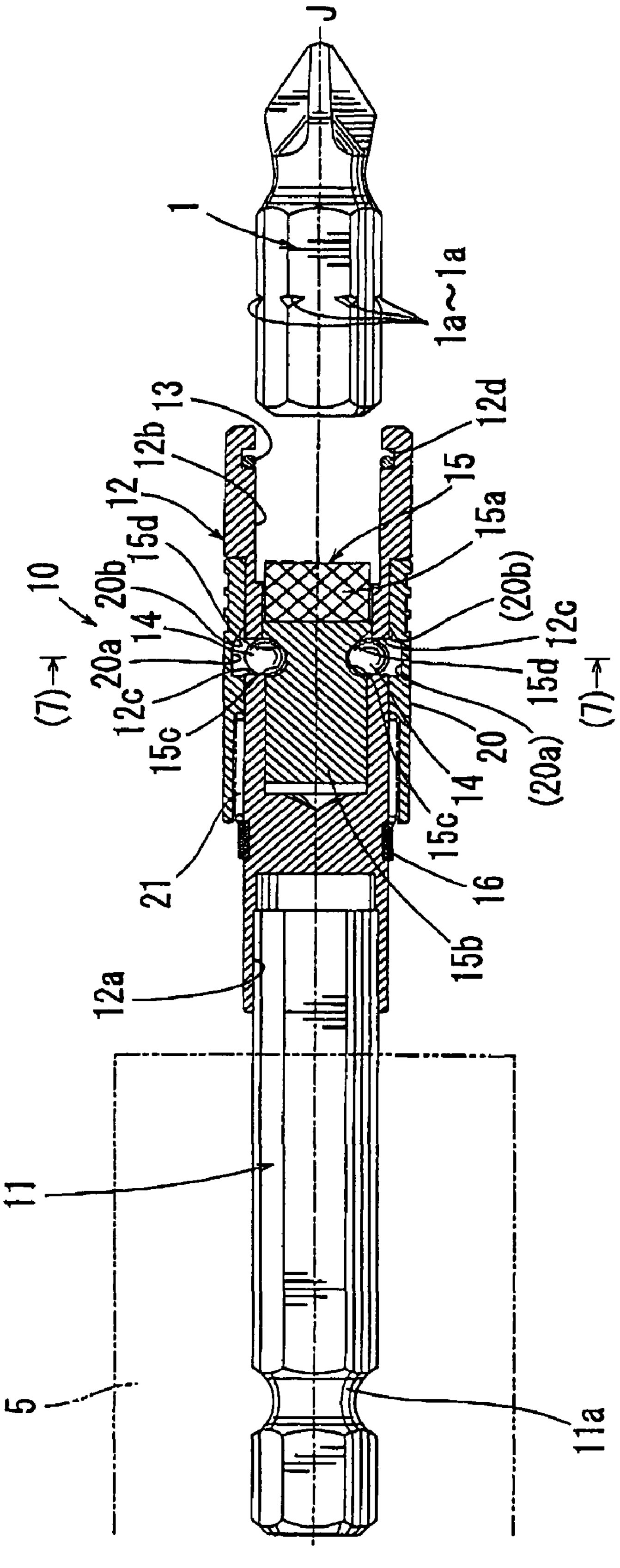
FIG. 6 is a view similar to FIG. 1, but showing the state where the tool bit has been removed.
Figure 7:
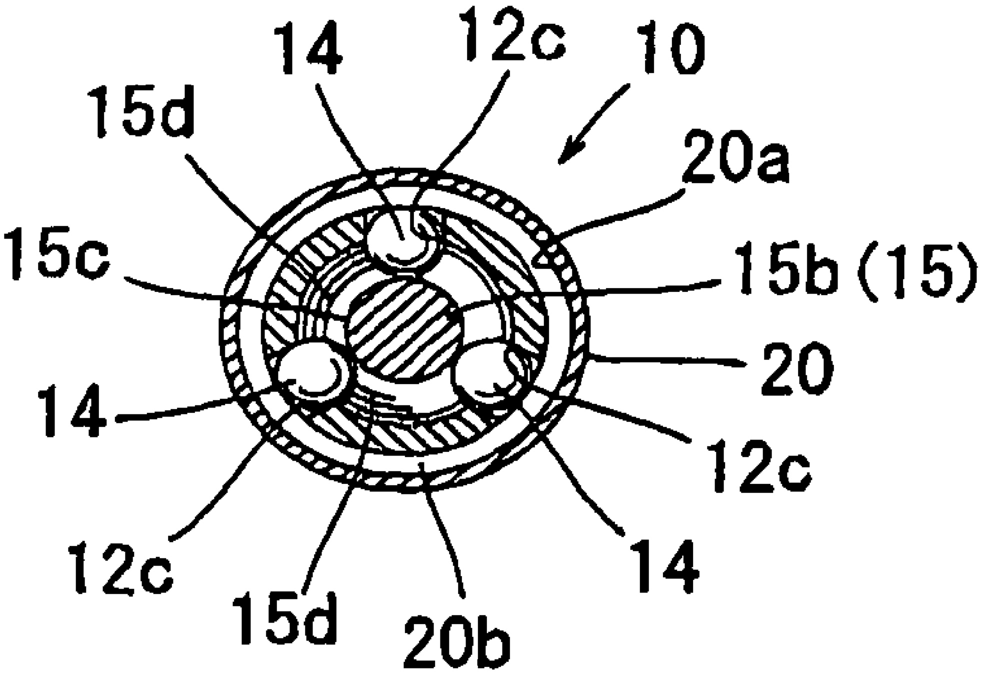
FIG. 7 is an enlarged cross sectional view taken along line (7)-(7) in FIG. 6.

After the tool bit 1 has been removed, the operator may releases the operation sleeve 20, so that the operation sleeve 20 returns toward the bit mounting position (right side as viewed in FIG. 4) by the biasing force of the compression spring 21. FIG. 6 shows the state where the tool bit 1 has been removed from the bit receiving hole 12*b* and the operation sleeve 20 has returned to the bit mounting position.

According to the bit mounting device 10 of the first embodiment described above, the tool bit 1 can be easily mounted by simply inserting the tool bit 1 into the bit receiving hole 12*b*. When the tool bit 1 reaches the predetermined position, the stop ring 13 resiliently engages the engaging recesses 1*a*, so that the tool bit 1 can be held in the predetermined position within the bit receiving hole 12*b*. In addition, because the bit push member 15 is positioned at the bottom of the bit receiving hole 12*b*, the rear end face of the tool bit 1 is attracted and retained by the magnetic force of the magnet 15*a* when the tool bit 1 has reached to the predetermined position where the stop ring 13 engages the engaging recesses 1*a*. Therefore, the tool bit 1 can be held at the predetermined position within the bit receiving hole 12*b* also by the engagement by the stop ring 13.

In order to remove the tool bit 1 that has been mounted as described above, the operator sidably moves the operation sleeve to the removing position against the biasing force of the compression spring 21. By this operation, the bit push member 15 moves toward the bit removing position, so that the tool bit 1 is pushed toward the bit removing direction and is disengaged from the stop ring 13. Therefore, the tool bit 1 can be removed by a smaller force than that required for removing the tool bit 1 from the bit receiving hole 12*b* by directly pinching the bit 1 with his or her fingers for removing the tool bit 1 against the engaging force of the stop ring 13.

As described above, the tool bit 1 is held within the bit receiving hole 12*b* by the stop ring 13 and the magnetic force of the magnet 15*a* of the bit push member 15. No steel ball engaging the outer circumferential surface of the tool bit 1 is used for preventing the tool bit 1 from being removed. Therefore, popularly used magnetic connecting bits can be used for the bit mounting device 10, so that the compatibility of the bit mounting device 10 can be ensured. In addition, it is possible that the bit mounting device 10 has a diameter that does not exceed a diameter of a conventional bit mounting device incorporating a stop ring engaging system.

Further, simply moving the operation sleeve 20 to the removing position can move the bit push member 15 for pushing the tool bit 1. Therefore, it is possible to remove the tool bit 1 by a small force comparative with a force required in a system where a steel ball(s) directly engages a tool bit.

Figure 8:
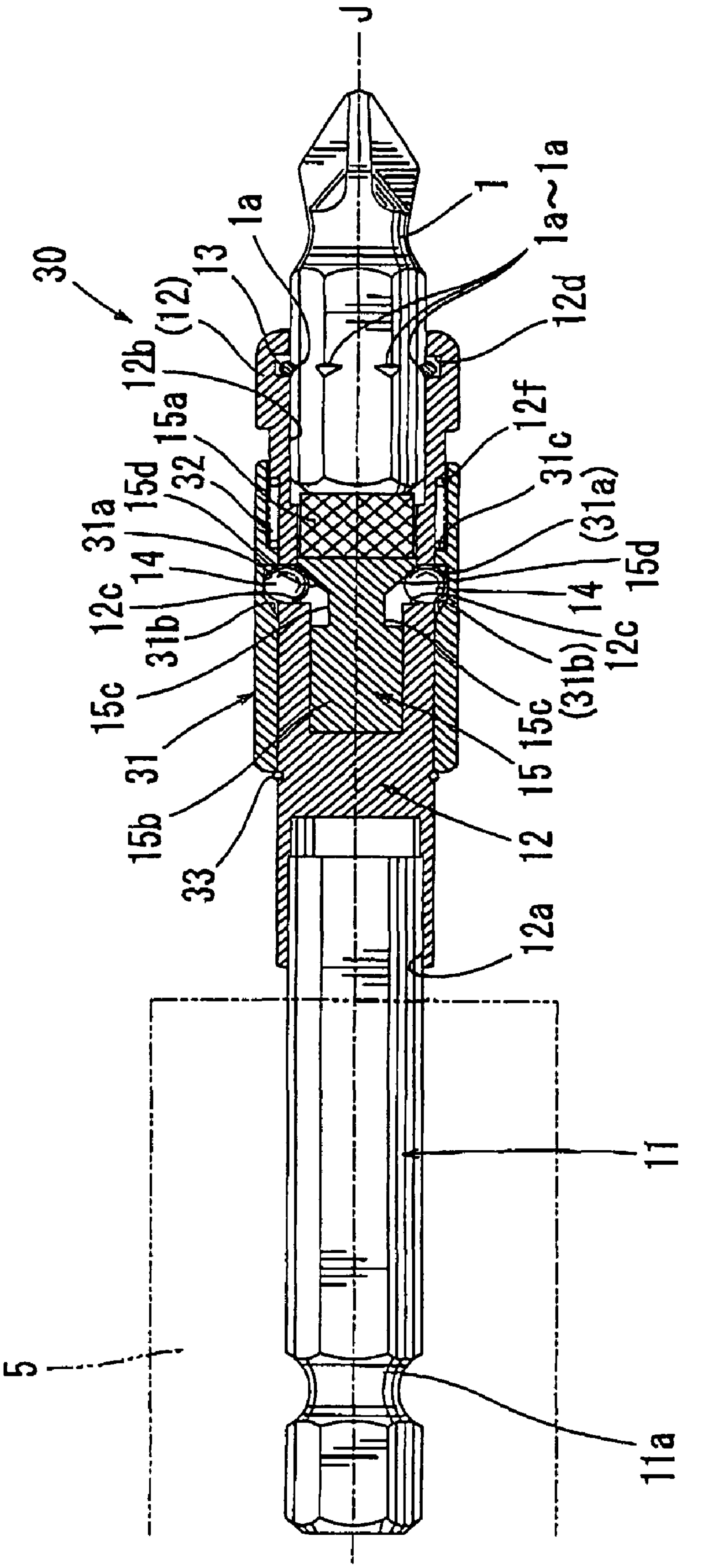
FIG. 8 is a vertical sectional view of a bit mounting device according to a second embodiment of the present invention and showing the state where a tool bit has been mounted.
Figure 9:
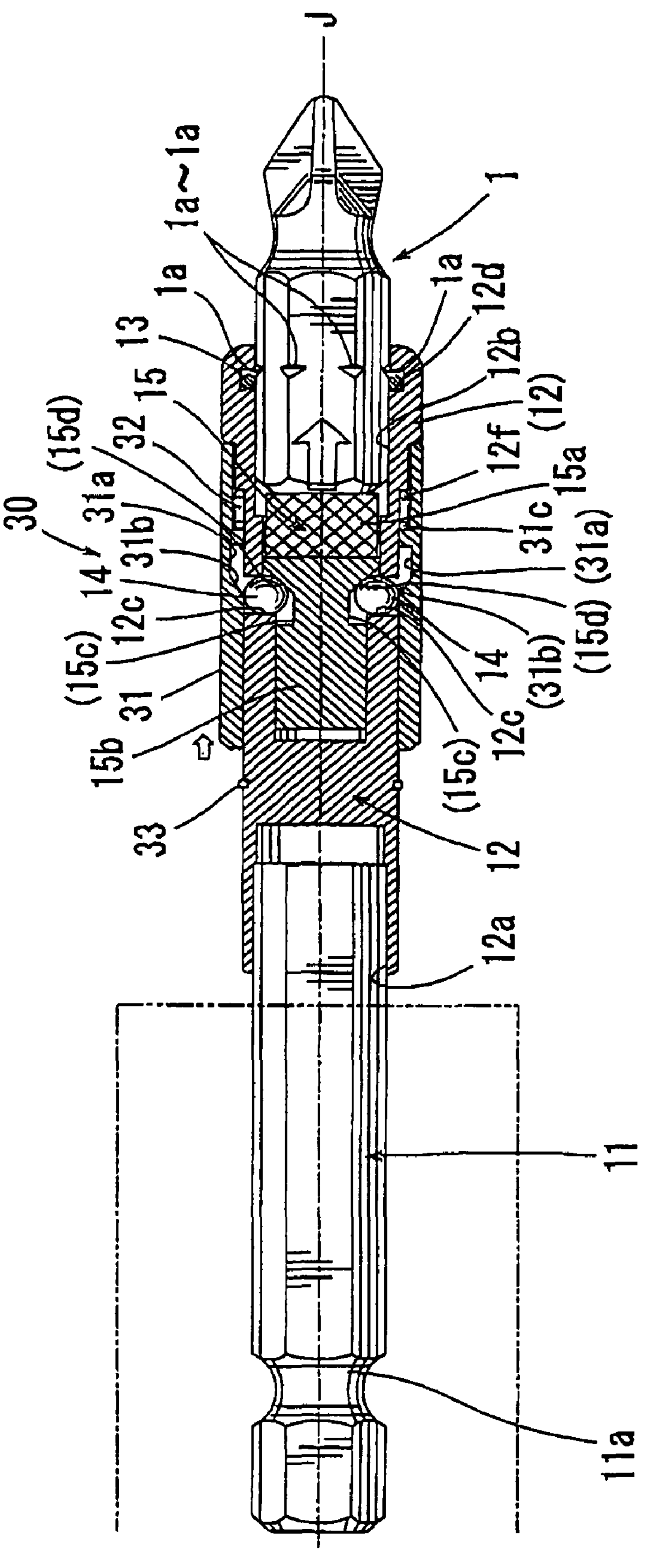
FIG. 9 is a vertical sectional view similar to FIG. 8, but showing the state where an operation sleeve has been slid to a bit removing position.
Figure 10:
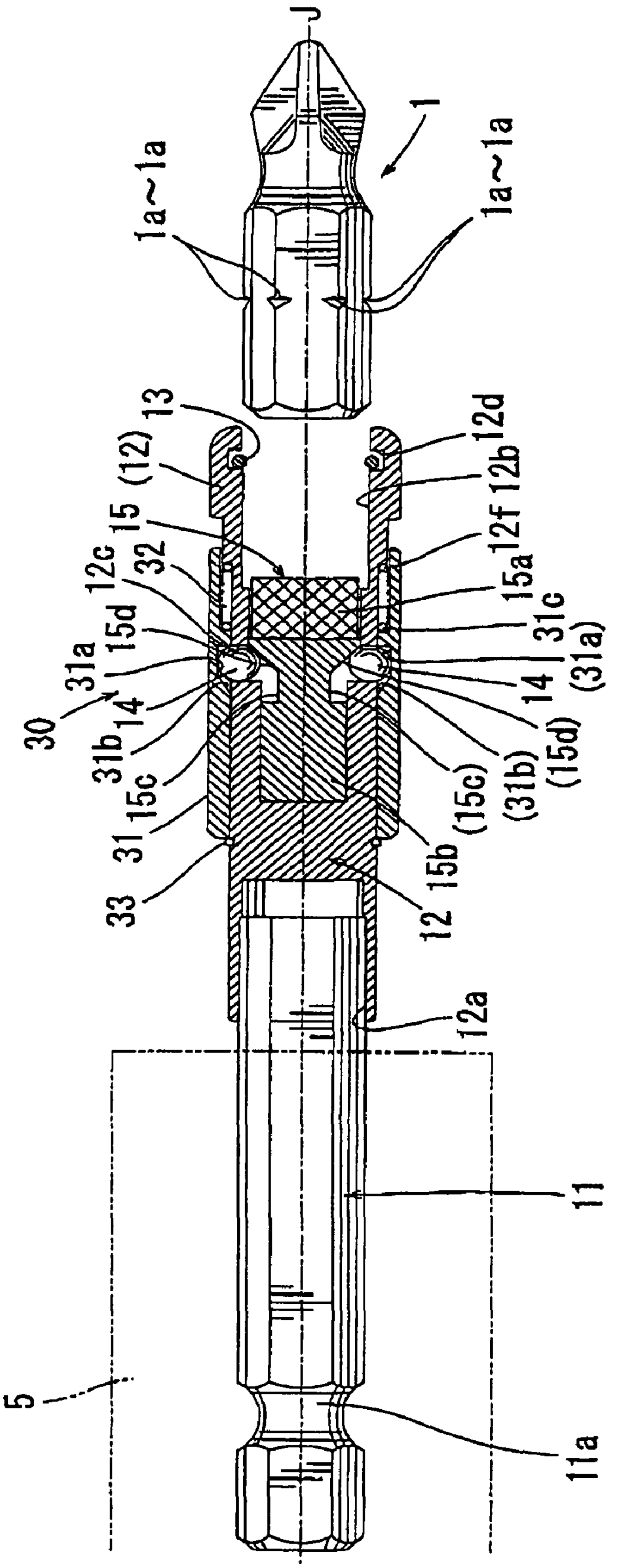
FIG. 10 is a vertical sectional view similar to FIG. 8, but showing the state where the tool bit has been removed.

In the above embodiment, the front side with respect to the sliding direction of the operation sleeve 20 is set to be the side of the bit mounting position and the rear side with respect to the sliding direction is set to be the side of the bit removing position. However, this arrangement may be reversed. Such a reversed arrangement will be described with reference to FIGS. 8 to 10 as a second embodiment. In FIGS. 8 to 10, like members are given the same reference numerals as the first embodiment, and the description of these elements will not be repeated.

A bit mounting device 30 of the second embodiment is different from the first embodiment in that the tool bit 1 can be removed from the bit receiving hole 12*b* when an operation sleeve 31 is moved toward the front side and that the tool bit 1 can be mounted within the bit receiving hole 12*b* when the operation sleeve 31 has been moved toward the rear side.

Similar to the first embodiment, the operation sleeve 31 is supported on the outer circumferential surface of the holder portion 12 such that the operation sleeve 31 can move in a direction along the axis J. An engaging groove 31*a* is formed in the inner circumferential surface of the operation sleeve 31 along its entire circumference. Unlike the first embodiment, a guide slant surface 31*b* is formed on the rear side surface (left side surface as viewed in FIG. 8) of the engaging groove 31*a*. The guide slant surface 31*b* has a conical configuration that has a diameter increasing in the forward direction along the axis J.

A compression spring 32 is interleaved between a stepped portion 31*c* formed on the inner circumferential surface of the operation sleeve 31 and a stepped portion 12*f* formed on the outer circumferential surface of the holder 12, so that the operation sleeve 31 is biased in the rearward direction (toward the bit mounting position) by the compression spring 32. The rear stroke end (i.e., the bit mounting position) of the operation sleeve 31 is restricted by a stop ring 33 that is secured to the outer circumferential surface of the holder 12. In the bit mounting state shown in FIG. 8, the operation sleeve 31 is held in the bit mounting position through abutment of the rear end of the operation sleeve 31 to the stop ring 33 by the biasing force of the compression spring 32. When the operation sleeve 31 is released after the tool bit 1 has been removed as shown in FIG. 10, the operation sleeve 31 returns to the bit mounting position and is held in this position by the biasing force of the compression spring 32.

Also in this second embodiment, as with the first embodiment, it is possible to provide a bit mounting device that has advantages of both of the stop ring engaging system and the steel ball engaging system.

Thus, as the tool bit 1 is inserted into the bit receiving hole 12*b* as shown in FIG. 8, the stop ring 13 resiliently engages the recesses 1*a* of the tool bit 1, while the rear end face of the tool bit 1 is attracted and held by the magnetic force of magnet 15*a* of the bit push member 15. As a result, the tool bit 1 can be held at a predetermined position within the bit receiving hole 12*b*. For this reason, popularly used magnetic connecting bits can be used for the bit mounting device 30, so that the compatibility of the bit mounting device 30 can be ensured. In other words, the advantage of the stop ring engaging system can be achieved.

In addition, the removal prevention of the tool bit 1 is made by the stop ring engaging system and not by the direct engagement of the steel ball(s) with the outer circumference of the tool bit 1. Therefore, it is possible that the bit mounting device 30 has a diameter that does not exceed a diameter of a conventional bit mounting device incorporating a stop ring engaging system.

Further, as the operation sleeve 31 is moved toward the removing position on the front side, i.e., on the side of the tool bit 1 against the biasing force of the compression position 31 as shown in FIG. 9, each steel ball 14 moves radially inward of the bit receiving hole 12*b* due to the inclination of the guide slant surface 31*b* of the operation sleeve 31. The radially inward movement of each steel ball 14 results that each steel ball 14 is pressed against the guide slant surface 15*d* of the magnet support 15*b*. Due to the inclination of the guide slant surface 15*d*, a force is produced to move the magnet support 15*b* toward the front side (bit removing direction). Hence, the bit push member 15 is forced to move toward the front side, and therefore, the tool bit 1 is pushed toward the front side and the tool bit 1 becomes free from resilient engagement by the stop ring 13.

Thus, also in this embodiment, simply slidably moving the operation sleeve 31 can push the tool bit 1 in the removing direction from the bit receiving hole 12*b*, so that it is possible to easily removing the tool bit 1 by a small operational force that is comparative with a force required in the arrangement where a steel ball(s) directly engages a tool bit. In other words, the advantage of the steel engaging system can be achieved.

The above embodiments can be modified in various ways. For example, in the above embodiments, the bit push member 15 has the magnet 15*a* secured to the magnet support 15*b* that has the guide slant surface 15*d*. However, it is possible to constitute the bit push member 15 only by a magnet and to provide the guide slant surface 15*d* directly on the magnet.

Although the bit push member 15 has the magnet 15*a* in the above embodiments, the bit push member 15 may have no magnet. For example, a bit push member can be made of steel (non-magnetized material) or a non-magnetic material, such as resin and rubber.

Further, in the above embodiments, the steel balls are pressed against the guide slant surface and the guide slant surface applies a force by virtue of its inclination for moving the bit push member 15 in the direction of the axis J. However, a gear mechanism may convert the sliding movement of the operation sleeve into the axial movement of the bit push member in order to push the tool bit 1 against the engagement by the stop ring 13.

In short, bit mounting devices of any other designs are possible in order that (1) the tool bit can be removed by a small operation force comparable with a force required in the steel ball engaging system, where a steel ball(s) directly engages a tool bit for preventing its removal, (2) it is possible that the bit mounting device has a small diameter in comparison with a diameter required in the case of the steel ball engaging system, and (3) popularly used magnetic connecting bits can be applied as they are. Thus, in order to move the bit push member, various mechanisms can be used other than the cam mechanism of the above embodiments, where the steel balls are pressed against the guide slant surface.

Furthermore, the tool bit 1 may be a driver bit or any other tool bits, such as a socket bit, used for various types of machining works.

This invention claims:

1. A bit mounting device for mounting a tool bit on a spindle of a rotary tool, comprising:

a mount shaft having an axis and constructed to be mounted to the spindle;

a holder defining a bit receiving hole, the bit receiving hole having the same axis as the mount shaft;

a stop ring attached to an inner circumference of an inlet portion of the bit receiving hole and directly engageable with the tool bit for preventing the tool bit from being removed from the bit receiving hole;

a bit push member positioned within the bit receiving hole on the side of a bottom of the bit receiving hole and movable in a bit mounting direction and a bit removing direction opposite to the bit mounting direction; and an operation sleeve attached to the holder and movable in opposite directions parallel to the axis of the mount shaft, wherein a force of the movement of the operation sleeve in one of the opposite directions is converted into a movement of the bit push member in the bit removing direction, so that the tool bit is disengaged from the stop ring.

2. The bit mounting device as in claim 1, further comprising:

at least one steel ball retained by the holder in a position around the bit receiving hole, the at least one steel ball being movable relative to the holder in a substantially radial direction with respect to the axis of the mount shaft; and a guide slant surface formed on the bit push member and inclined relative to the direction of the movement of the at least one steel ball, wherein as the operation sleeve moves in one of the opposite directions, the at least one steel ball slides along the guide slant surface, so that the movement of the at least one steel ball is converted into the movement of the bit push member in the bit removing direction.

3. The bit mounting device as in claim 1, wherein the bit push member comprises a magnet that can attract and hold the tool bit.

4. The bit mounting device as in claim 1, wherein there is no spring for biasing the bit push member in the bit removing direction.

5. The bit mounting device as in claim 1, wherein when the tool bit is disengaged from the stop ring, the operation sleeve moves in one of the opposite directions that is opposite to the bit removing direction.

6. A bit mounting device for a power tool, comprising:

a holder defining a bit receiving hole configured to receive a tool bit and extending along an axial direction;

a bit push member disposed within the bit receiving hole and movable relative to the holder along the axial direction;

an operation member movably attached to the holder; and a transmission mechanism interleaved between the operation member and the bit push member, so that a force of the movement of the operation member is converted into a force of movement of the bit push member.

7. The bit mounting device as in claim 6, further comprising a resiliently deformable stop ring attached to the inner circumferential surface of the bit receiving hole, so that the tool bit can be held in position within the bit receiving hole by the resilient force of the stop ring.

8. The bit mounting device as in claim 7, wherein the bit push member comprises a magnet that can attract and hold the tool bit in position.

9. The bit mounting device as in claim 6, wherein:

the operation member can move in a direction parallel to the axis of the bit receiving hole;

the transmission mechanism comprises a cam mechanism including a cam member that can move in a direction transverse to the axis of the bit receiving hole as the operation member is moved.

10. The bit mounting device as in claim 9, wherein the cam mechanism comprises a first cam surface formed on the operation member and a second cam surface formed on the bit push member, and wherein the cam member is interleaved between the first cam surface and the second cam surface.

11. The bit mounting device as in claim 10, wherein:

the cam member comprises at least one ball member;

the first cam surface is inclined in a first direction relative to a plane perpendicular to the axis of the bit receiving hole; and the second cam surface is inclined in a second direction opposite to the first direction with respect to the plane, as the operation member moves in the direction parallel to the axis of the bit receiving hole, the at least one ball member slides along the first cam surface and is pressed against the second cam surface, so that the bit push member moves in the axial direction.

12. The bit mounting device as in claim 11, wherein:

the first cam surface comprises a first conical surface; and the second cam surface comprises a second conical surface.

13. The bit mounting device as in claim 11, wherein the at least one ball member is supported by the holder, so that the at least one ball member can move in a radial direction relative to the holder.

14. The bit mounting device as in claim 10, wherein:

the cam member comprises at least one ball member;

the first cam surface and the second cam surfaces are inclined in the same direction relative to a plane perpendicular to the axis of the bit receiving hole; and as the operation member moves in the direction parallel to the axis of the bit receiving hole, the at least one ball member slides along the first cam surface and is pressed against the second cam surface, so that the bit push member moves in the axial direction.

15. The bit mounting device as in claim 14, wherein:

the first cam surface comprises a first conical surface; and the second cam surface comprises a second conical surface.

16. The bit mounting device as in claim 14, wherein the at least one ball member is supported by the holder, so that the at least one ball member can move in a radial direction relative to the holder.

17. The bit mounting device as in claim 6, wherein there is no spring for biasing the bit push member in a bit removing direction.

* * * * *